United States Patent
Girardin

(10) Patent No.: US 6,641,342 B1
(45) Date of Patent: Nov. 4, 2003

(54) FLOOR POCKET ANCHOR ASSEMBLY

(76) Inventor: Jean Marc Girardin, 4000, NE. 168th St., #105, North Miami Beach, FL (US) 33160

( * ) Notice: Subject to any disclaimer, the term of this patent is extended or adjusted under 35 U.S.C. 154(b) by 0 days.

(21) Appl. No.: 10/135,434

(22) Filed: May 1, 2002

(51) Int. Cl.[7] .................................................. B60P 7/08
(52) U.S. Cl. ........................ 410/106; 410/110; 410/116
(58) Field of Search ................................ 410/106, 110, 410/116; 24/115 K, 265 CD; 248/499

(56) References Cited

U.S. PATENT DOCUMENTS

| 4,877,361 | A | * | 10/1989 | DeRosa et al. | 410/112 |
| 4,948,311 | A | * | 8/1990 | St. Pierre et al. | 410/107 |
| 5,180,263 | A | * | 1/1993 | Flowers, Jr. | 410/106 |
| 5,738,471 | A | * | 4/1998 | Zentner et al. | 410/110 |
| 6,039,520 | A | * | 3/2000 | Cheng | 410/106 |
| 6,142,718 | A | * | 11/2000 | Kroll | 410/106 |
| 6,183,178 | B1 | * | 2/2001 | Bateman | 410/116 |
| 6,213,696 | B1 | * | 4/2001 | Austin | 410/106 |
| 6,350,089 | B1 | * | 2/2002 | Tekavec | 410/106 |

* cited by examiner

Primary Examiner—Stephen T. Gordon
(74) Attorney, Agent, or Firm—Dowell & Dowell, P.C.

(57) ABSTRACT

A floor pocket assembly for use in securing a load to a vehicle floor. A pair of slightly spaced coaxial circular plates are bolted to the floor and a connector is snapped over the top plate by a U-shaped member on one planar side thereof, and held in place by a spring loaded pin which extends into the bore of the two circular plates.

6 Claims, 4 Drawing Sheets

FLOOR POCKET ANCHOR ASSEMBLY

FIELD OF INVENTION

This invention relates to a cargo tie-down system, and more particularly to a floor pocket anchor assembly for installation in a vehicle floor and use as a quick release anchor point for a tie down system. A preferred, but non-limiting, application of the present invention is for use in securing a wheelchair in a bus or other van type conveyance.

BACKGROUND OF INVENTION AND PRIOR ART

Numerous floor pockets or anchor points have been developed for use in vehicles to secure loads of all kinds, including wheelchairs, and generally include a plate with an anchoring device which is countersunk into the floor and held in place by an integral or separate bolt. Such devices may simply be a bar or rod to which a clip may be snap-attached. While such devices are generally quite effective, they tend to collect dirt and dust and require frequent cleaning of the pocket to ensure ease of operation. Furthermore, such devices are generally directional in that the attachment must always be from the same direction and/or the load must be applied from a single preselected direction. Attempts have been made to eliminate, or at least substantially reduce, the open pocket size so as to alleviate the dirt collection problem, and to provide pockets which can be used to accept loads from a plurality of directions. One such pocket will be discussed in more detail hereinbelow, but even this pocket does not provide for positive locking of the connector, nor can the load be applied over a 360° range. There remains, therefore, a need for a floor pocket that provides positive locking and full-circle load application.

OBJECT OF INVENTION

An object of the present invention is to provide a floor pocket assembly for use in a vehicle floor for securing loads thereon, which provides positive locking and which can be used from any direction.

BRIEF STATEMENT OF INVENTION

By one aspect of this invention there is provided

DETAILED DESCRIPTION OF PREFERRED EMBODIMENTS

Figure 1:
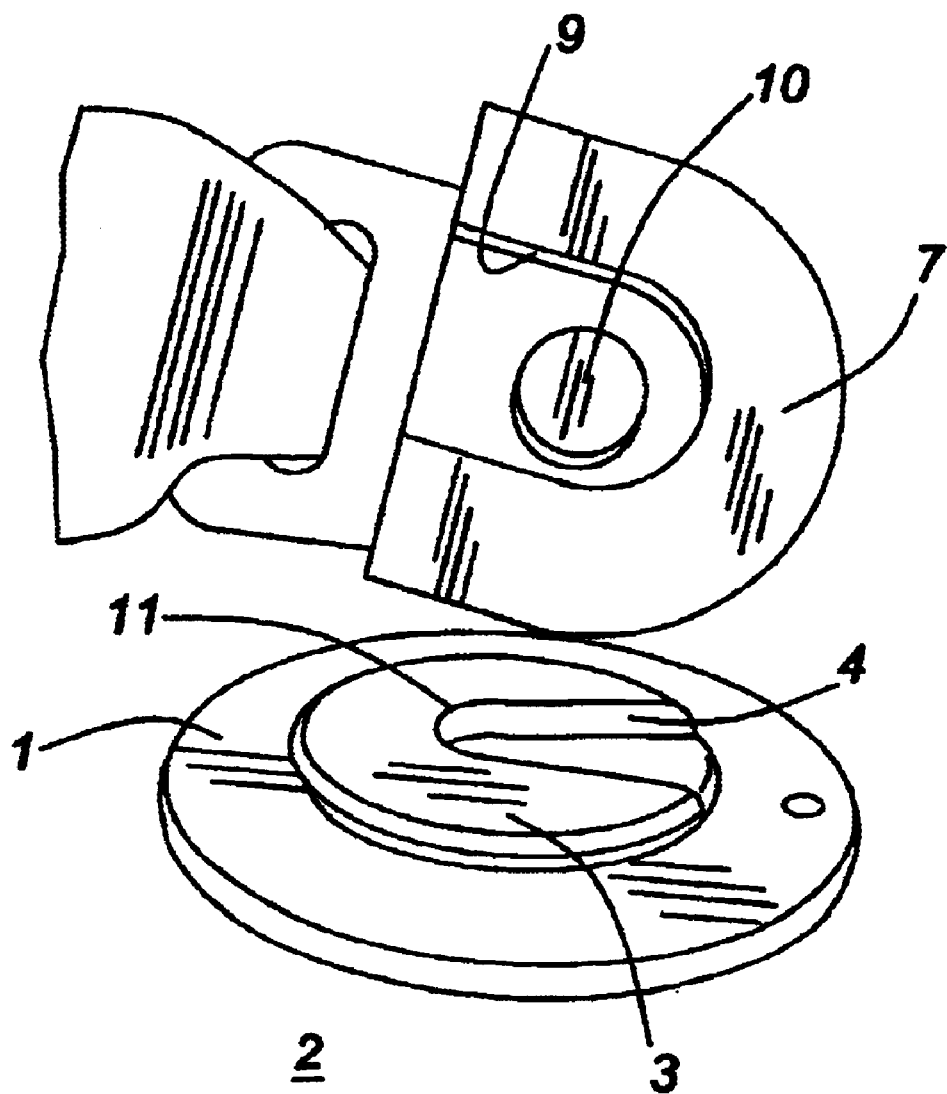
FIG. 1 is a perspective view of a floor pocket assembly of the prior art, in unassembled position.
Figure 2:
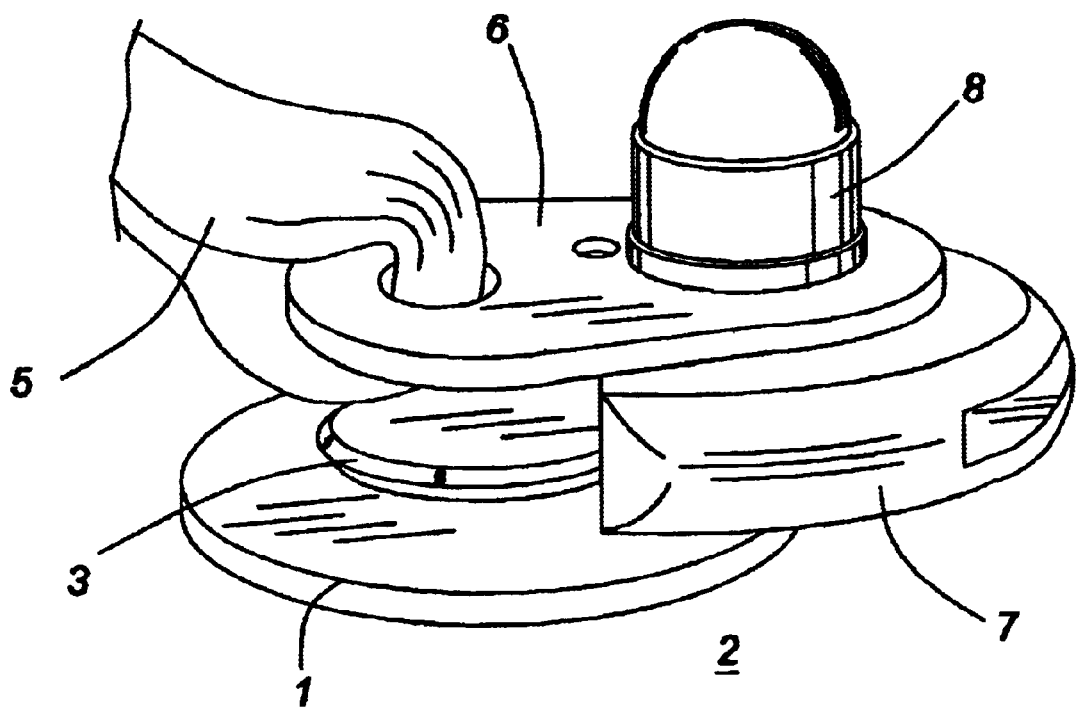
FIG. 2 is a perspective view of the pocket assembly of FIG. 1, in partially assembled position.

Referring to FIGS. 1 and 2, there is shown a commercially available floor pocket assembly, marketed by the Unwin Company of Great Britain. A circular planar floor plate 1 is provided with an integral floor bolt (not shown) projecting axially perpendicularly thereto for attachment through a bolt hole in the floor 2 of a vehicle. Plate 1 is also provided with an integral coaxial circular plate 3 in overlying planar relationship thereto, having a somewhat smaller diameter than plate 1 and spaced from plate 1 by a central boss (not shown) having a diameter less than the diameter of plate 3, so as to provide a male connector means. Plate 3, is provided with a radially extending slot 4, extending partially through the thickness thereof, as best seen in FIG. 1. A load securing belt 5, generally but not essentially fabricated from nylon webbing, is secured to one end of a planar metal connector 6 at a proximal end thereof. The other end of connector 6 secured to a substantially U-shaped member 7, so as to provide a female connector means adapted to fit over plate 3, by means of a bolt (not shown) and a dome-headed nut 8. The lips 9 of U-shaped member 7 slidably and releasably engage with plate 3. The underside of member 7 is also provided with a projecting cylindrical pin 10, adapted for slidable and releasable engagement with slot 4. In operation, the open end of U-shaped member 7 is aligned with slot 4 so that pin 10 can slidably engage therewith and member 7 is then pulled into engagement with member 3 and pin 10 abuts the closed end 11 of slot 4. Member 7 is then rotated through approximately 90°, so as to releasably lock member 7 to the floor plate 1. It will be appreciated that member 7 can be rotated through 360°, relative to plate 1, but is not locked thereto when the open end thereof is aligned with the slot 4. Thus, positive locking in all positions is not achieved.

Figure 3:
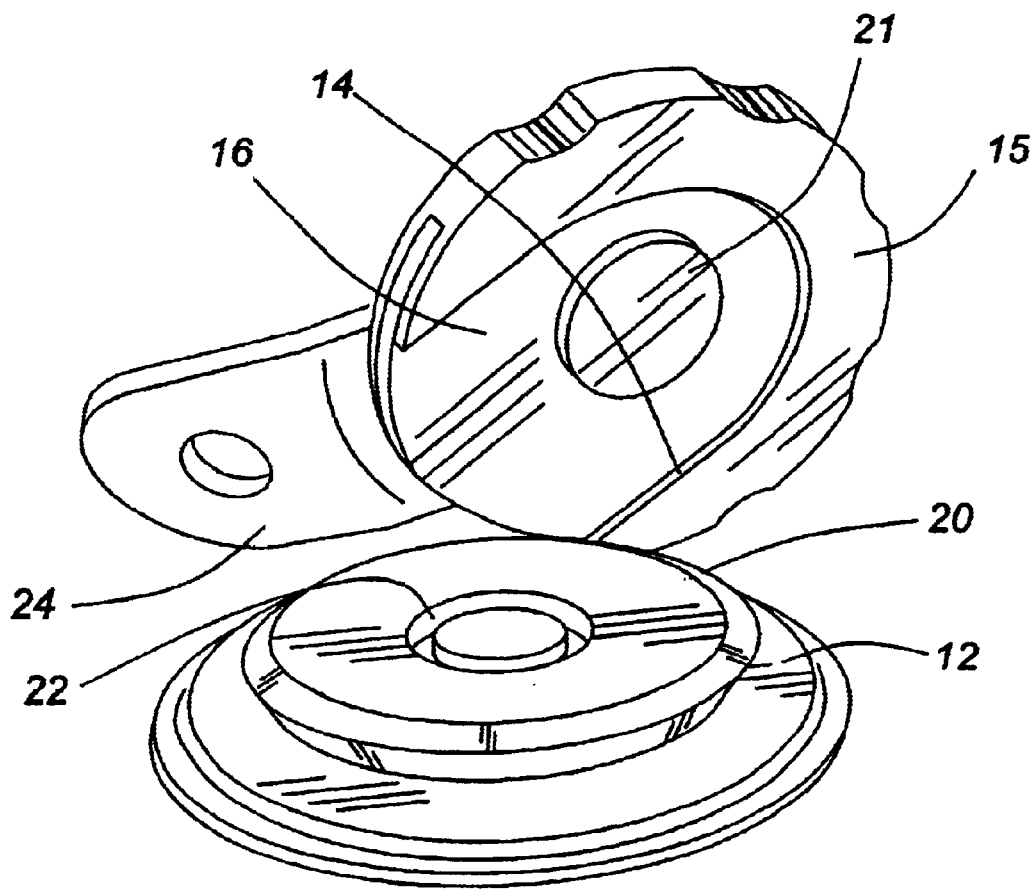
FIG. 3 is a perspective view of one embodiment of a floor pocket assembly according to one embodiment of the present invention, in unassembled position.
Figure 4:
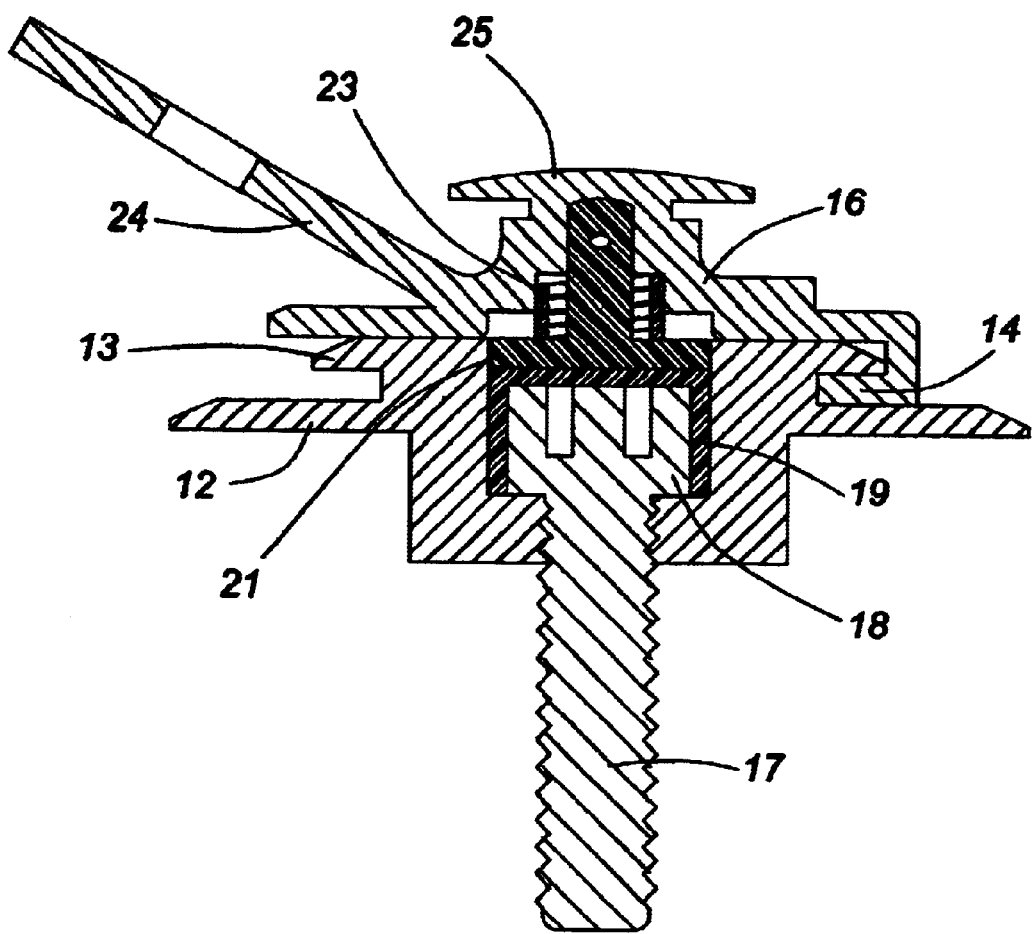
FIG. 4 is a side view, in section of the floor pocket of FIG. 3, in assembled position.

As seen in FIGS. 3 and 4, the present invention has some superficial similarities to the prior art device described above, in that there is provided a circular floor plate 12 having an integral spaced coaxial circular plate 13 in overlying planar relationship thereto. Plate 13, generally but not essentially having a diameter less than plate 12, and integrally formed therewith, is adapted to be slidably and releasably engaged by the lips 14 of a U-shaped member 15 on the underside of a circular member 16. Plates 12 and 13 are secured to a floor 2 by means of a separate bolt 17 passing axially therethrough. Preferably, but not essentially, the bolt head 18 is provided with a rubber or thermoplastic cover plug 19. Note that plate 13 is not provided with a slot comparable to slot 4 of the prior art, but that the circumference of plate 13 is provided with a tapered or bevelled edge 20. Member 16 is provided with a coaxial spring loaded headed pin 21 which extends from the lower face thereof, under the action of compression spring 23, and is adapted to releasably engage with bore 22 of plate 13. In operation, member 16 can be brought into overlying relationship with plate 13 from any direction. Headed pin 21 contacts bevelled edge 20 of plate 13 and rides up thereon, compressing spring 23 until the end face of pin 21 is flush with the underface of member 16. Member 16 then slides into coaxial relationship with plate 13; whereupon pin 21 is forced into bore 22 so as to provide positive locking of member 16 to floor plate 12, whatever the position of connector 24 relative to plate 12. Generally, but not essentially, connector 24 is integrally formed with member 16. In order to disconnect member 16 from plate 12, an operator grips the pin release knob 25 and pulls upwardly, thereby compressing spring 23 and raising pin 21 out of bore 22 so that member 16 may be slidably disconnected from plate 13.

I claim:

1. A floor pocket assembly for securing a load to a floor, comprising:
   a first circular plate having an axial bore therethrough;
   a second circular plate coaxial with, and spaced in overlying relation from, said first circular plate and having an axial bore therethrough;

means to secure said first and second plates to said floor through said axial bores;

circular, substantially planar connector means having a U-shaped member on one planar side thereof adapted to slidably and releasably engage said second circular plate when in overlying planar relationship thereto, and axially extending spring loaded pin means in said connector means adapted to slidably and releasably engage said axial bore in said second circular plate when said connector means is in said overlying planar relationship to said second circular plate.

2. A floor pocket assembly as claimed in claim 1, wherein said first and second circular plates are integrally formed.

3. A floor pocket assembly as claimed in claim 1, wherein said connector means and said U-shaped member are integrally formed.

4. A floor pocket assembly as claimed in claim 1, wherein said means to secure said first and second circular plates comprises a headed bolt means.

5. A floor pocket assembly as claimed in claim 4, including cap means for said headed bolt means.

6. A floor socket assembly as claimed in claim 5, wherein said cap means is selected from a rubber and a thermoplastic cap.

* * * * *